July 19, 1927.
E. L. LEINBACH
SHOCK ABSORBER
Filed March 14, 1921
1,636,005
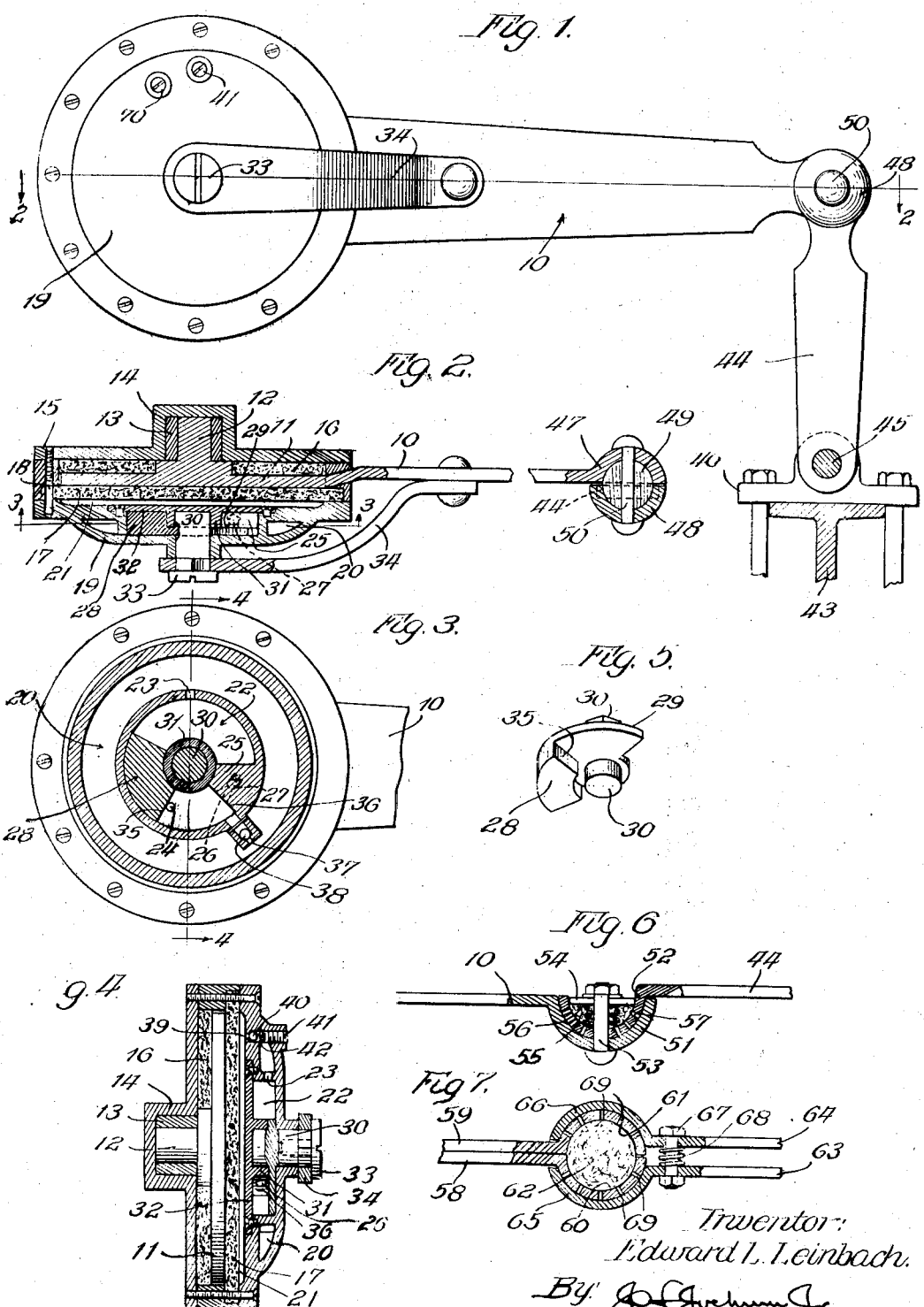
Inventor:
Edward L. Leinbach.

Patented July 19, 1927.

1,636,005

UNITED STATES PATENT OFFICE.

EDWARD L. LEINBACH, OF CHICAGO, ILLINOIS.

SHOCK ABSORBER.

Application filed March 14, 1921. Serial No. 452,184.

This invention relates to improvements in shock absorbers, particularly adapted though not necessarily limited in its use to be interposed between the axle and body of a vehicle for the purpose of retarding the re-action of the springs when they are suddenly compressed or expanded, such as by the passage of the vehicle over irregular portions of a road bed, thereby preventing a sudden shock or jolting of the vehicle.

More specifically the invention relates to a combined friction and fluid controlled device of this character and in which the fluid operates to render the friction means active and inactive, the fluid itself being controlled by the movement of the part, the rebound of which it is desired to retard or check.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which Figure 1 is a side elevation.

Figure 2 is a sectional view taken on line 2—2, Figure 1.

Figure 3 is a detail sectional view taken on line 3—3, Figure 2.

Figure 4 is a vertical sectional view taken on line 4—4, Figure 3.

Figure 5 is a perspective view of the fluid circulating and pressure creating means.

Figure 6 is a detail sectional view of a modified form of folding joint.

Figure 7 is a view similar to Figure 6 of still another modified form of folding joint.

Referring more particularly to the drawing the numeral 10, designates an arm which is provided with an enlarged portion 11, at one end thereof forming a friction surface. This portion 11 is preferably provided with a trunnion 12, adapted to be seated in a suitable bearing 13, held within a recess 14 of a casing 15. The casing 15 receives and confines a predetermined amount of fluid and the fluid is circulated within the casing and is subjected to varying pressures in a manner as hereinafter described. On one side of the element 11 is a friction disc 16, constructed of any suitable material and co-operates with one of the faces of the element 11. On the other side of the element 11 is a friction disc or element 17, constructed of any suitable material. This element 17 normally stands adjacent the opposite face of the element 11, and is held against movement with respect to the element 11 in any suitable manner such as by means of fastening devices or screws 18, which anchor the element 17 to the casing 15. Connected with the casing 15, is an element 19, which is provided with a chamber 20 therein for containing any suitable fluid. A suitable fluid which has been found efficient in the operation of this device is oil, although it is not desired to limit this application or invention to the use of any particular fluid. The element 19, is preferably shaped so as to form a chamber 21, across which the element 17 extends so that fluid from the chamber 20 may flow into and out of the chamber 21 in a manner to be hereinafter set forth.

The element 19 is provided with a chamber 22 therein and which chamber 22 has communication with the chamber 20 in any suitable manner such as by means of an opening 23. The element 19 also has an opening 24 forming a communication between the chambers 21 and 22. The chamber 22 is provided with a partition 25, having an opening 26, therein which also communicates with the chamber 21, this opening 26 being controlled by a suitable automatically operating valve 27, such as a spring controlled ball. The ball 27 is adapted to be unseated by the fluid when pressure is exerted thereupon in a manner to be hereinafter described so as to permit the fluid to flow from the chamber 22 into the chamber 21, but the value 27 is automatically seated by the back pressure of the fluid thereagainst.

Arranged within the chamber 22, is a piston like element 28, which is of a size considerably smaller than the chamber and connected with this element 28 is a flange 29, having a trunnion 30, which latter is adapted to be seated in a suitable bearing 31, preferably carried by an element 32, which constitutes one of the walls of the chamber 22. The trunnion 30 projects on both sides of the flange 29, and secured to the free end of the trunnion by means of a suitable fastening device 33, is an arm 34, the free end of which is connected with the arm 10, so that when the arm 10 is oscillated in a manner to be hereinafter set forth the arm 34, and also the piston like element 28, will also be oscillated. The partition 25, is of a height slightly less than the height or depth of the chamber 22, so as to permit fluid to flow across the top of the partition 25 at predetermined times in the operation of the device and also permit the flange 29 to pass over the top of the partition to cut off or close such passage for the fluid.

The wall 35, of the element 28 co-operates with the wall 36, of the partition 25 to trap fluid between these two walls so that when the element 28, is moved in a direction towards the partition 25, the fluid which is trapped between the walls 35 and 36 will be forced through the opening 26, from the chamber 22, past the valve 27, and into the chamber 21. The pressure thus created upon the fluid which is being forced into the chamber 21, will exert its pressure upon the friction element 17, to force the same against the adjacent friction surface of the element 11, and thereby increase the friction between these two parts so as to retard or check the sudden rebound or movement of these parts one with relation to the other.

The fluid is supplied to the chamber 22, between the wall 35 and the wall 36, of the element 28 and partition 25, in any suitable manner preferably through an inlet opening 37, having communication with the chamber 20, and which opening 37 may be controlled by an automatically operating valve, preferably a ball valve, 38, so that after the fluid has been forced from the chamber 22 through the opening 26, in the manner just described, when the parts are moving in one direction, and when the element 28 starts to move in the opposite direction, the suction created in the space between the walls 35 and 36 will cause the fluid to flow from the chamber 20 into the said space. As the fluid is thus supplied to the chamber 22 between the element 28 and partition 25, the pressure of the fluid against the element 17, will be relieved to decrease the degree of friction between the element 17 and the element 11. This is accomplished by reason of the fact that the element 28 will open or uncover the passage 24 between the chamber 22 and the chamber 21. The opening 23 is also provided as a means whereby the fluid will be allowed to circulate between the chambers 20 and 22, when the device is operating under normal conditions, and to take care of the fluid which flows across the partition 25 when the flange 29 is moved away from the partition 25.

In order to obviate the danger of too great a pressure being exerted upon the flexible friction element 17, when pressure is being exerted thereupon and when the opening 24 is closed, and thereby prevent injury to the device, there is provided a safety outlet 39, which forms a communication between the chamber 21 and chamber 20. This outlet 39, may be controlled by a valve 40, which in turn is controlled by an adjustable element or screw 41, interposed between which screw 41 and valve 40 is a spring 42. By adjusting the screw 41, it will be manifest that the stress of the spring 42, upon the valve 40 may be varied and through this medium the degree of pressure necessary to operate or unseat the valve 40 may be controlled at will.

It is thought that the operation of this improved device will be clearly understood from the foregoing, but briefly stated it is as follows.

Under normal conditions, the parts will be in the position shown in Figure 3, so that any slight or limited degree of oscillating movement of the friction elements 11 and 17 will circulate the fluid between the chambers 20 and 21 through the passages 23—24 and 27 and across the top of the partition 25, and the friction elements will have a free relative movement one with relation to the other and which free movement will be maintained as long as the passage 24 remains open and is uncovered by the element 28. Under abnormal conditions or any sudden or extended relative movement of the friction surfaces 11 and 17, the arm 10 will move upwardly and cause the element 28, which is connected thereto to move toward the partition 25, that is the wall 35 of the element 28 will be moved in a direction towards the wall 36, of the partition 25. This operation will cause the element 28 to first close the opening or passage 24, and at the same time the flange 29 will move over the top of the partition 25, this will trap fluid between the wall 35 and 36. The pressure upon this trapped fluid will operate to close the valve 38 and at the same time unseat the valve 27. By unseating the valve 27, the fluid will flow through the passage 26, into the chamber 21, and against the flexible friction element 17, thereby forcing the same against the friction element or surface 11, to increase the degree of friction therebetween. When the parts are moved in the opposite direction and when the element 28 moves sufficiently to uncover or open the passage 24, there will be a circulation of the fluid from the chamber 21, into the chamber 22, through this opening 24, and the pressure upon the element 17 will be relieved, and the friction surfaces 11 and 17 will then be adapted for free and easy movement with respect to each other.

The arm 10 is connected with any suitable part 43, of a vehicle in any suitable manner preferably by means of a link 44, pivotally connected as at 45, with a clip 46. The joint shown in Figures 1 and 2 formed between the arms 10 and 44, is of the foldable type. To that end the extremity of the arm 10 is shaped to form a cup shaped portion 47, and the extremity of the arm 44 is shaped to form a cup shaped portion 48, co-operating with the cup shaped portion 47, so that when these two parts 47—48, are placed together they will form a closed receptacle therebetween and in which receptacle, and as shown in Figure 2, there is located a spherical fibrous element 49, which is preferably saturated with a lubricant. The arms 10 and 44, are held together preferably by means of a suitable fastening device 50, in the form of a pin or bolt which passes through the portions 47—48 of the respective arms and also through the element 49, in the same direction as the grain of the element 49, so as not to split the element. It will be manifest that during the oscillatory or folding and opening movements of the arms 10 and 44, the element 49 will serve to lubricate the joint.

In the form of the invention shown in Figure 6, the end of the arm 10 is shaped to form a semi-circular portion 51, while the end of the arm 44 is shaped to form a cup shaped portion 52, which fits within the portion 51. The two portions are held together by means of a fastening device 53, which engages a plate 54, that extends across the cup shaped portion 52 of the arm 44, and interposed between the plate 54 and the portion 52, may be a spring 55, the chamber formed between the plate 54 and the portion 52, being adapted to receive a suitable filling 56, for lubricating the parts, the portion 52 being preferably provided with apertures 57, to permit the lubricant to pass therethrough.

In the form of the invention shown in Figure 7, the arm 10, is preferably constructed of two separate elements 58—59, the extremities of which are shaped in opposite directions to form cup shaped portions 60—61, adapted to be placed together to form a chamber therebetween for the reception of a lubricant saturated element 62.

The arm 44 in this form of the invention is preferably constructed of separate elements 63—64, the extremities of which are respectively shaped to form cup shaped portions 65—66, adapted to receive the portions 60 and 61, a fastening device 67, being provided for securing the elements 63—64 together, and if desired an elastic member such as a spring 68, may be interposed between the elements 63—64.

The elements 60—61 are provided with suitable openings 69, so as to permit the lubricant to flow between the adjacent movable parts.

Obviously a fill opening 70 may be provided through which the fluid may be delivered into the casing and such opening is provided with a suitable closure.

While the preferred form of this invention has been herein shown and described, it is to be understood that various changes may be made in the details of construction and in the combination and arrangement of the several parts, within the scope of the claims, without departing from the spirit of this invention.

What is claimed as new is:—

1. A shock absorber including a casing having a predetermined amount of fluid confined therein, a friction disc, a flexible friction element co-operating with the said disc, there being a fluid chamber across which the said flexible element extends, and means for causing the fluid to operate against the said element to force the latter against the said disc to increase the friction therebetween.

2. A shock absorber including a casing having a predetermined amount of fluid confined therein, a friction disc, a flexible friction element co-operating with the said disc, there being a fluid chamber across which the said flexible element extends, and means for causing the fluid to operate against the said element to force the latter against the said disc to increase the friction between the said element and disc, the said means embodying an automatically operated fluid circulating and pressure creating device.

3. A shock absorber including a casing having a predetermined amount of fluid confined therein, a friction disc, a flexible friction element co-operating with the said disc, there being a fluid chamber across which the said flexible element extends, means for causing the fluid to operate against the said element to force the latter against the said disc to increase the friction between the said element and disc, relatively movable parts, and means operatively connecting the first recited means with one of the said relatively movable parts whereby the first recited means will become active when the said parts are relatively moved in a predetermined direction.

4. A shock absorber including a casing having a predetermined amount of fluid confined therein, a friction disc having a flat surface, a flexible friction disc adjacent said surface, means individual to the said discs for imparting a relative movement to the discs one with relation to the other, and means for forcing the fluid against one surface of the said flexible disc to increase the degree of friction between the said discs.

5. A shock absorber including a casing having a predetermined amount of fluid confined therein, a friction disc having a flat surface, a flexible friction disc adjacent said surface, means individual to the said discs for imparting a relative movement to the discs one with relation to the other, and means operating automatically to force the fluid against one surface of the said flexible disc to increase the degree of friction between the said discs, the last recited means also operating automatically to permit the pressure of the fluid upon the said disc to be relieved and while the fluid is confined in the casing.

6. A shock absorber including a casing having a predetermined amount of fluid confined therein, a pair of friction elements also within the casing, an intermediate friction element with which the first recited elements co-operate, one of the said friction elements being laterally flexible, means for imparting a relative movement to adjacent friction elements one with relation to the other, and means for exerting a pressure upon the said fluid to cause the latter to influence the said flexible element to increase the degree of friction between the last said element and the adjacent co-operating friction element.

7. A shock absorber including a casing having a predetermined amount of fluid confined therein, a pair of friction elements also in the casing, an intermediate friction element with which the first recited elements co-operate, one of the said friction elements being laterally flexible, means for imparting a relative movement to adjacent friction elements one with relation to the other, and means for exerting a pressure upon the said fluid to cause the latter to influence the said flexible element to increase the degree of friction between the last said element and the adjacent co-operating friction element, the last recited means also operating to permit the fluid pressure to be relieved.

8. A shock absorber embodying a pair of friction elements, an intermediate friction element with which the first recited elements cooperate, one of the said friction elements being laterally flexible, means for imparting a relative movement to adjacent friction elements one with relation to the other, and means whereby such relative movement in a predetermined direction will automatically cause a fluid pressure to be exerted against one of the said elements to increase the degree of friction between said friction element and the adjacent co-operating friction element.

9. A self-contained shock absorber including two co-operating friction elements movable relatively one with relation to the other, means for confining a predetermined amount of fluid for controlling the friction between the elements, means including pressure creating means operating upon the fluid, and means operating automatically to relieve the fluid pressure when said pressure exceeds a predetermined degree.

10. A shock absorber embodying a casing having a predetermined amount of fluid confined therein, two co-operating friction elements also within the casing and movable relatively one with relation to the other, means whereby the degree of friction between the said elements may be controlled by the fluid, the said means embodying pressure creating means operating upon the fluid, and means operating automatically to relieve the fluid pressure when said pressure exceeds a predetermined degree, the last recited means embodying provisions whereby the degree of pressure at which the pressure relieving means operates may be varied at will.

In testimony whereof I have signed my name to this specification on this 9th day of March, A. D. 1921.

EDWARD L. LEINBACH.